May 17, 1938. H. KÜPPENBENDER 2,117,429
CAMERA
Filed Nov. 5, 1936 5 Sheets-Sheet 1
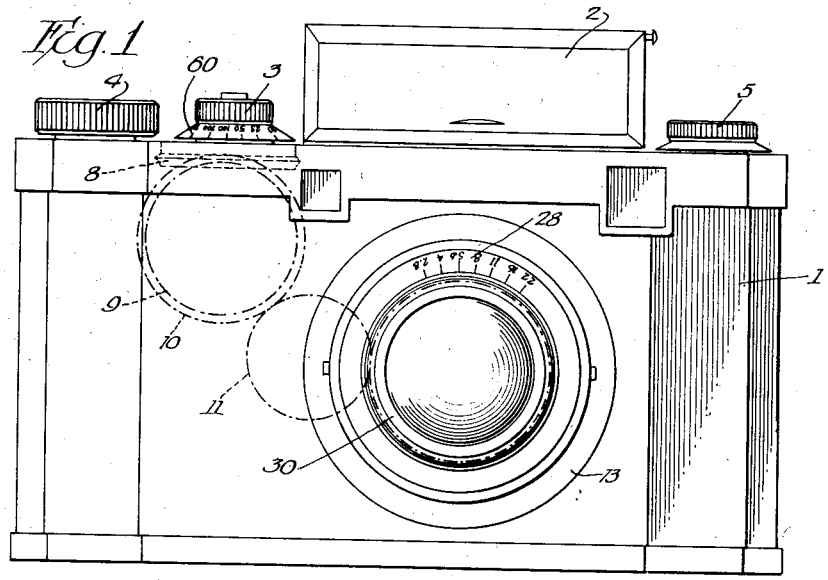
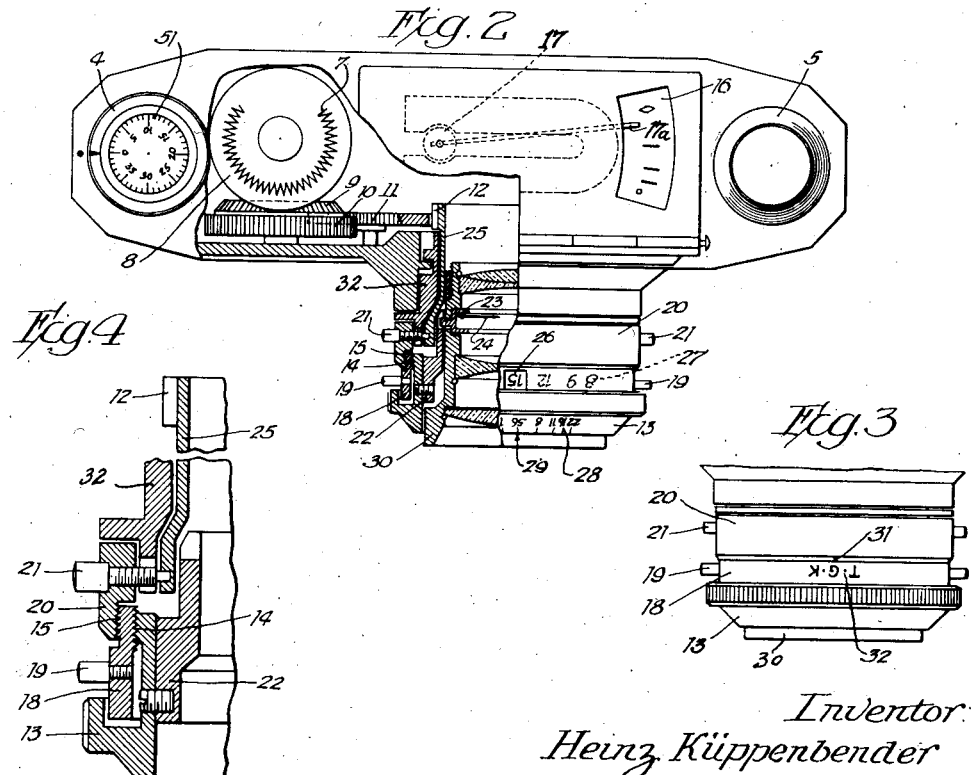
Inventor:
Heinz Küppenbender
by B. Singer
Attorney

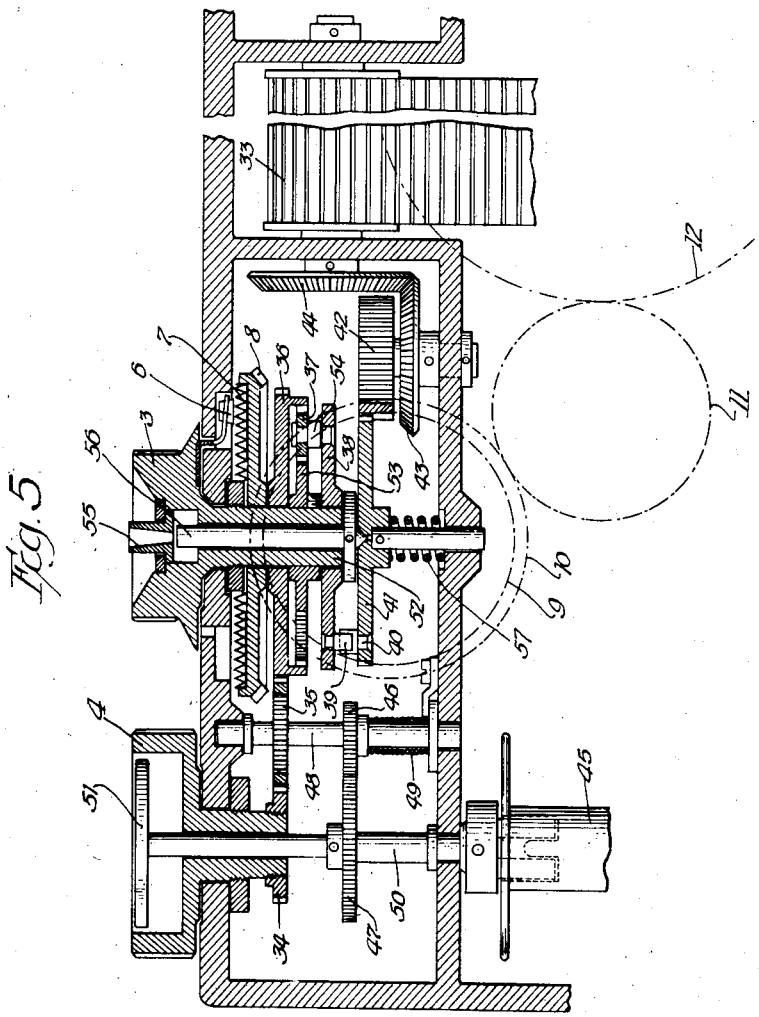

May 17, 1938.   H. KÜPPENBENDER   2,117,429
CAMERA
Filed Nov 5, 1936    5 Sheets-Sheet 3

Inventor
Heinz Küppenbender
by B. Singer
Attorney

May 17, 1938.  H. KÜPPENBENDER  2,117,429
CAMERA
Filed Nov. 5, 1936   5 Sheets-Sheet 4

Inventor.
Heinz Küppenbender
by B. Singer
Attorney

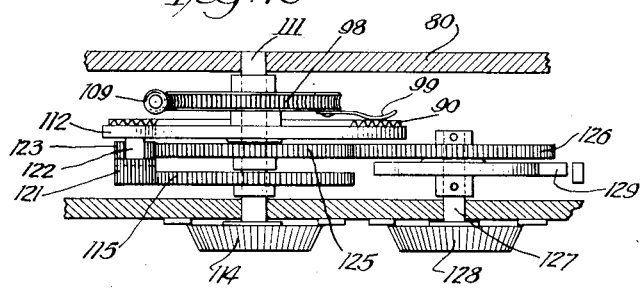
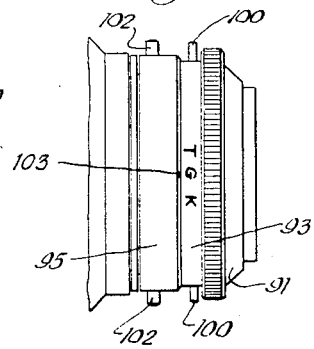
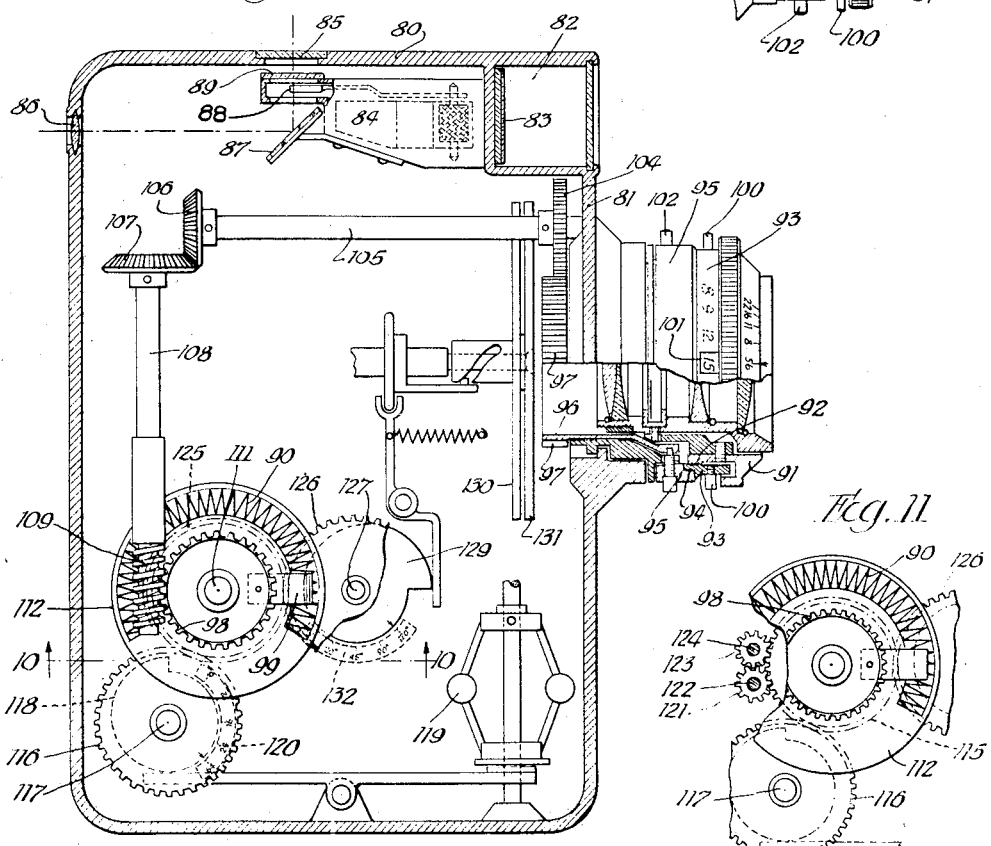
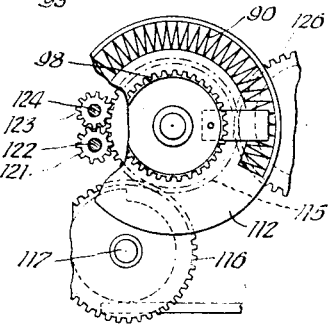

Patented May 17, 1938

2,117,429

UNITED STATES PATENT OFFICE 2,117,429

CAMERA

Heinz Küppenbender, Dresden, Germany, assignor to Zeiss Ikon Aktiengesellschaft, Dresden, Germany Application November 5, 1936, Serial No. 109,273
In Germany June 26, 1936

14 Claims. (Cl. 95—10)

The invention relates to improvements in photographic and motion picture cameras provided with a photoelectric exposure meter.

It is an object of the invention to provide the photoelectric exposure meter with a variable electrical resistance which is operatively connected with the various adjustable members of the camera, as for instance, the diaphragm means and the shutter speed adjustment means, and is also adapted to be adjusted for various film speeds.

In particular, it is an object of the invention to provide means adapted to adjust the resistance in the circuit of the photoelectric exposure meter in accordance with the type of light which passes through the lens system of the camera, as natural light, filtered light (for instance when a yellow filter is attached to the lens system) and artificial light.

Another object of the invention is to connect the means for adjusting the resistance of the exposure meter in accordance with the type of light and also the adjusting means for taking the film speed into consideration with the operative connection between the diaphragm adjustment means and said resistance.

In accordance with a further object of the invention, the last named operative connection is provided with two adjustable couplings, one of which is adapted to be adjusted in accordance with the type of light passing through the lens system and the other coupling is adapted to be adjusted for various film speeds.

It is also an object of the invention to arrange the means for adjusting the resistance of the exposure meter in accordance with the type of light passing through the lens system, and also the means for considering the film speed, on the lens system, particularly when the latter is exchangeably mounted on the camera casing.

Another object of the invention is to provide an exchangeable photographic lens system with an electric resistance, which is mounted on the diaphragm adjustment ring of said lens system and is engaged by a slidable contact member adapted to vary said resistance when the shutter speed adjusting member of said lens system is adjusted.

A further object of the invention is to provide the last named lens system with an adjustable coupling in the operative connection between said slidable contact member and said shutter speed adjusting member, said coupling being adapted to adjust the slidable contact member relatively to said shutter speed adjusting member and thereby vary said resistance in accordance with the type of light passing through the lens system and also in accordance with various film speeds.

A still further object of the invention is to provide a motion picture camera with a photoelectric exposure meter in which a single electric resistance is employed. This resistance is operatively connected with the diaphragm adjusting ring on the lens system, the operative connection including adjustable coupling means for adjusting the resistance to different types of light passing through the lens system and different film sensitivenesses or film speeds. Furthermore, means are provided for adjusting said resistance in accordance with the picture frequency and in accordance with the size of the variable shutter aperture.

With these and other objects in view, the invention consists in the combination of parts and arrangement thereof as described by way of example in the following description, with reference to the accompanying drawings.

The drawings illustrate various embodiments of the invention:

Fig. 1 is a front elevation view of a photographic camera, having the photoelectric cell of the exposure meter mounted upon the top wall of the camera casing.

Fig. 2 is a top plan view of the camera with the top wall partly broken away and the lens system shown partly in horizontal section.

Fig. 3 is an elevation view of the lens system from the bottom of Fig. 1 to show the adjusting device adapted to adjust the lens system for different types of illumination, as natural light, filtered light and artificial light.

Fig. 4 illustrates in an enlarged scale a portion of Fig. 2, namely the arrangement of the adjustable couplings.

Fig. 5 is an enlarged vertical section of the upper portion of the camera, and illustrates the arrangement of the resistance of the exposure meter in connection with the shutter speed adjusting knob, and the coupling of the shutter tensioning knob with the film take-up spool and the curtain shutter respectively.

Fig. 9 shows the invention applied to a motion picture camera, which is shown in vertical section with a portion of the lens system in elevation.

Fig. 10 illustrates the construction of the differential gearing between the picture frequency adjusting device and the shutter sector adjusting device for varying the position of the resistance of the photoelectric exposure meter, substantially on the line 10—10 of Fig. 9.

Fig. 11 shows a detail of Fig. 9 with parts broken away.

Fig. 12 is an elevation view of the adjusting device of the lens system of the motion picture camera for adjusting the same to natural light, a filter and artificial light respectively.

Figure 13:
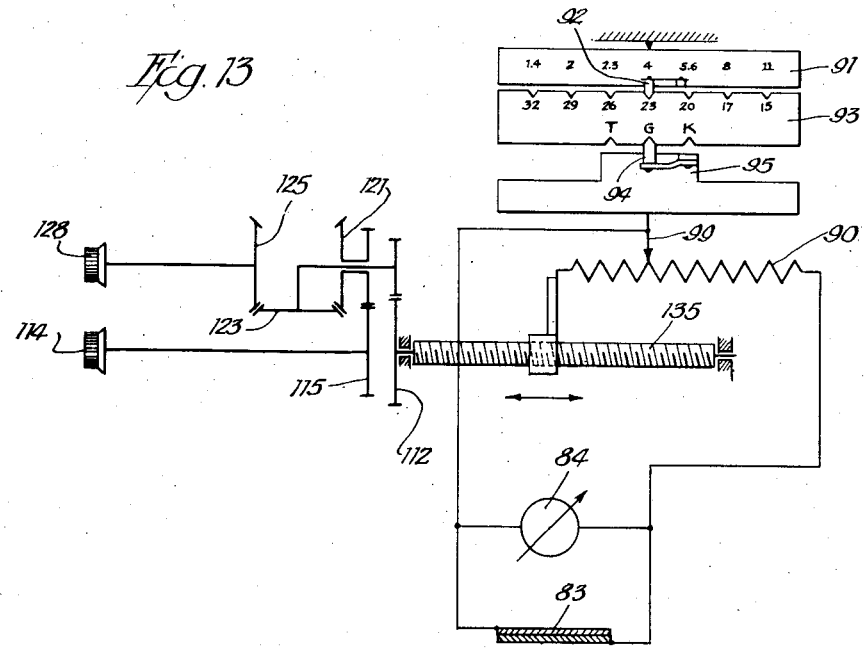
Fig. 13 illustrates diagrammatically the coupling of the various adjusting devices of the motion picture camera with the resistance of the photoelectric exposure meter.

In the embodiment of the invention disclosed in the Figs. 1 to 5 the photoelectric cell 2 of the exposure meter is mounted upon the narrow top wall of the camera casing 1. On this top wall is also mounted the shutter speed adjusting member 3, the shutter tensioning and film conveying member 4 and the member 5 for rewinding the film. The shutter speed adjusting member 3 according to Fig. 5 has attached thereto a contact member 6 which slidably engages the electrical resistance 7 of the exposure meter. This resistance 7, it will be noted, is mounted in the interior of the camera casing 1 and is carried by a gear 8, which is loosely rotatable about the axis of the shutter adjusting member 3. The gear 8 is adapted to be rotated by a gear train 9, 10, 11, 12 which in turn is driven by the diaphragm adjusting ring 13.

According to Fig. 2 the pointer 17a of the measuring instrument 17 of the exposure meter may be observed through a window 16 in the top wall of the camera casing 1.

In the drive connection between the diaphragm adjusting ring 13 and the gear 12 are arranged two adjustable couplings 14 and 15 which are employed for taking in consideration, firstly the film speed and secondly the illumination of the object, whether natural light (day light), artificial light or a filter is used. The coupling 14 is formed by a fine thread of low pitch which is produced on the inner end of the diaphragm adjusting ring 13 and engages rather tightly a similar inner thread at one end of a ring 18 which concentrically surrounds the inner portion of the diaphragm adjusting ring 13. Pins 19 projecting radially outward from the ring 18 form finger engaging means and facilitate a relative rotative adjustment of the rings 13 and 18. The diaphragm adjusting ring 13 is rigidly connected with a sleeve 22 which is adapted to rotate a ring 23 carrying the segments 24 of the iris diaphragm.

The outer coupling 15 is similarly constructed and consists of a fine thread of low pitch produced on the outer circumference of the ring 18 at the same end which has the inner thread forming a portion of the coupling 14. This outer thread on the ring 18 engages a similar inner thread on a ring 20, which is provided with radially outwardly extending pins 21 to facilitate a relative rotation of the rings 18 and 20. All the rings 13, 18 and 20 due to their rather tight threaded engagement rotate normally as a unit, when one of the rings is rotated. Only then when one ring is manually grasped and held against rotation while another ring is manually rotated there will be obtained a relative rotative adjustment between the rings 13, 18 and 18, 20 respectively.

The pins 21 pass entirely through the ring 20 and project radially inward to connect the ring 20 non-rotatably with a sleeve 25, which according to Fig. 2 has the gear 12 secured thereto.

In order to adjust the resistance 7 for the speed of the film which is employed, the ring 18 is rotated relatively to the diaphragm adjusting ring 13, until the desired film speed (15° Scheiner in the illustrated embodiment, Fig. 2) appears in a window 26 of the ring 18. The film speed scale 27 is engraved or otherwise produced upon that portion of the outer circumference of the diaphragm adjusting ring 13 which is covered by the ring 18. The diaphragm scale 28 is arranged on an outer conical portion of the diaphragm adjusting ring 13 and cooperates with a fixed mark 29 on the lens mounting 30.

In order to adjust the resistance 7 for the particular illumination of the object to be photographed or more correctly, for the light which passes through the lens system, when a filter is employed, the ring 20 is rotated relatively to the ring 18 until the mark 31 on the ring 20 points to the desired letter T, G or K arranged on the ring 18 diametrically opposite the window 26 (see Figs. 2 and 3). The letter T stands for natural light, the letter G for filtered light and the letter K for artificial light.

It will be noted that the parts 12, 13, 18, 20, 22, 23, 24, 25 and 30 are combined with the lens system proper to form with the same a unitary structure which is exchangeably attached to the camera casing 1 by means of a mounting sleeve 32 and a customary bayonet lock or the like.

According to Fig. 5, the camera is provided with a curtain shutter 33 which is adapted to be tensioned and adjusted by a planetary gearing upon rotation of the members 4 and 3 respectively. The rotative movement of the shutter tensioning member 4 is transmitted to the shutter shaft by the gear train 34, 35, 36, 37 the clutch members 38, 39, 40 and the further gear train 41, 42, 43 and 44. Simultaneous with the rotation of the member 4 the film wind-up spool 45 is rotated, namely by the gear train 34, 35, 46 and 47. The gears 35 and 46 are fixedly secured on a shaft 48 which is equipped with means 49 permitting a rotation of the shaft 48 in one direction only. The shaft 50 carrying the gear 47 and rotating the film spool 45 is extended upwardly into a recess of the member 4 and is provided at its upper end with a counting disc 51. After the shutter has been tensioned and the film advanced the shutter speed adjusting member 3 has to be actuated to adjust the slot in the curtain. This is accomplished by rotating the member 3 which is provided with a tubular shaft 52 extending into the camera casing and on which the gears 8, 36 and the clutch disc 38 are loosely mounted. The gear 53, however, is fixedly secured to the tubular shaft 52 and meshes with the planetary gear 37 which is mounted on a stub shaft 54 secured to the clutch disc 38. Upon rotation of the member 3, the gear 53 will rotate the gear 37 which rolls along the internal teeth of gear 36 and rotates the clutch disc 38 with the clutch member 39 according to the desired width of the curtain slot.

The release of the shutter 33 is effected by depressing the button 55 which is axially slidably mounted in the shutter speed adjusting member 3. The button 55 pushes a rod 56 extending through the bore of the tubular shaft 52 downwardly and the rod 56 in turn displaces the clutch disc 38 axially against the action of a spring 57 until the clutch members 39, 40 are disengaged, so that the shutter can run off.

Figure 6:
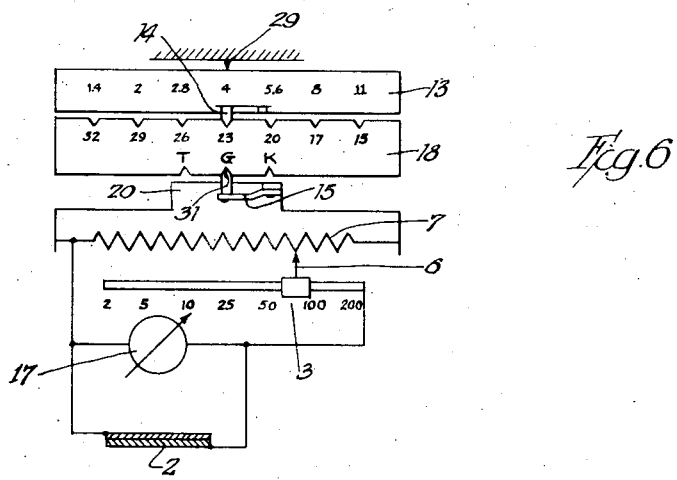
Fig. 6 illustrates diagrammatically the coupling of the photo electric exposure meter with the various adjusting means of the camera.

Fig. 6 illustrates diagrammatically the connection of the photoelectric exposure meter with the shutter speed adjusting member 3 and the diaphragm adjusting ring 13, and particularly is intended to explain the operation of the couplings 14 and 15. Upon rotation of the shutter speed adjusting member 3 the contact 6 secured thereto slides along the resistance 7. The resistance 7 in turn is adapted to be rotated with respect to the contact 6 by rotating the diaphragm adjusting ring 13. As described in the foregoing, however, there are arranged two adjustable couplings 14 and 15 in the operative connection between the diaphragm adjusting ring 13 and the resistance 7. It is advisable and most practical to adjust these couplings prior to adjusting the diaphragm and shutter speed. If, for instance, a color filter is employed while making an exposure, then the coupling 15 is adjusted by rotating the rings 18 and 20 relatively with respect to each other until the mark 31 is opposite the letter G. If a film material of a speed of 23° Scheiner is used, then the rings 13 and 18 are rotated relatively to each other, or in other words, the coupling 14 is adjusted, until the number 23 appears in the window of ring 13. If now the diaphragm adjusting ring 13 is rotated alone for the purpose of setting the diaphragm, then the couplings 14 and 15 act as rigid connecting members and the parts 13, 18, 20, 25 and 12 rotate as a unit to operate the gear train 11, 10, 9 and 8 and thereby rotate the resistance into a position corresponding to the employed filters, film speed and diaphragm opening.

The camera is now directed with its lens toward the subject to be photographed, the photoelectric cell, of course, has to be exposed to the light reflected from the subject, and by observing the measuring instrument the shutter speed adjustment member 3 is rotated until the pointer 17ª of the measuring instrument assumes a predetermined position. The speed for which the member 3 then has been automatically adjusted is indicated by the scale 60 on the member 3 and this is the correct speed for the prevailing camera settings and light conditions. It is, however, also possible, to adjust the shutter for a certain speed and then adjust the diaphragm adjusting ring 13 until the pointer 17ª of the measuring instrument 17 has been moved to the predetermined position. In the latter case the diaphragm will be correctly and automatically adjusted.

Since the various adjustments are all translated into a single resistance, it is of course required that the diaphragm scale 28, the film speed scale 27 and also the shutter speed scale 60 are provided each with a uniform division and that the shutter speed adjusting member 3 remains stationary when the shutter is tensioned by member 4 and subsequently runs off. It will be noted that the camera illustrated in the drawings fulfills these requirements.

Figure 8:
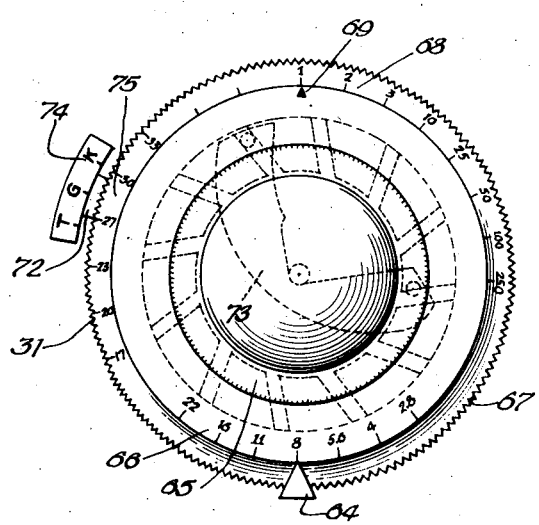
Fig. 8 is a front elevation view of the lens system of Fig. 7.
Figure 7:
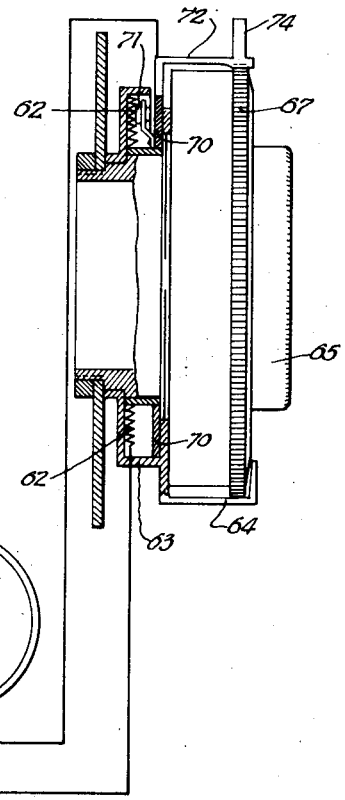
Fig. 7 illustrates diagrammatically another embodiment of the invention, in which the resistance of the photoelectric exposure meter is fixedly mounted on the diaphragm adjusting ring of the lens system.

The Figs. 7 and 8 illustrate another embodiment of the invention in which the electrical resistance 62 of the photoelectric exposure meter is attached to a lens system, which also carries the shutter speed adjusting means. According to Fig. 7 the electrical resistance 62 is mounted on the rotatable diaphragm adjusting ring 63 which is provided with a pointer 64 extending to the front of the lens system 65 where the diaphragm scale 66 is arranged. The diaphragm segments are indicated at 73. A shutter speed adjusting ring 67 having a toothed outer circumference is rotatable around the lens system and is provided with a shutter speed scale 68 cooperating with a fixed mark 69. A ring 70 rotatably mounted within the diaphragm ring 63 carries a contact member 71 which is slidable along the resistance 62. A resilient angular lever arm 72 extends outwardly from this ring 70 and its outer leg is provided with teeth engaging the teeth on the circumference of the shutter speed adjusting ring 67. Due to its resiliency the angular arm 72 is normally maintained in engagement with the ring 67 and when the latter is rotated the ring 70 and the contact member 71 thereon are likewise rotated.

Attached to the free end of the angular arm 72 and positioned in the plane of the ring 67 is an arcuate plate 74 having thereon the letters TGK extending in circumferential direction of the ring 67. These letters have the same meaning as the same letters arranged on the ring 18 of the first embodiment.

By lifting the arm 72 out of engagement with the ring 67 it may be rotatably adjusted along a film speed scale 75 on the ring 67. Any one of the letters TGK may be brought opposite the desired film speed division to properly adjust the resistance 62. As shown in Fig. 8 the camera is set for taking a picture at artificial light, (letter K) by employing a film having a speed of 30° Scheiner. It will be noted that also in this embodiment the diaphragm scale 66, the film speed scale 75 and the shutter speed scale 68 are each provided with a uniform division.

The photoelectric cell is indicated in Fig. 7 at 76 and the measuring instrument at 77.

When the diaphragm ring 63 is rotated the resistance 62 is moved relatively to the contact member 71, which latter may be independently moved by the shutter ring 67, due to its adjustable coupling with the angular arm 72. The manner of operation is the same as the one described in connection with the first embodiment. Either the diaphragm or shutter speed may be first adjusted, whereby the other member is automatically adjusted when the pointer of the measuring instrument is brought into the proper position.

The Figs. 9 to 12 illustrate the invention in combination with a motion picture camera.

According to Fig. 9 the front wall 81 of the camera casing 80 is provided with a light shaft 82 for housing the photoelectric cell 83. The measuring instrument of the exposure meter is indicated at 84 and the same may be either observed through a window 85 in the top wall of the camera casing or through a lens 86 in the rear wall of the same. A mirror 87 reflects the image of the pointer 88 and a transparent scale 89 toward the lens 86.

The resistance 90 of the exposure meter is controlled by rotatable members which are combined with the exchangeable lens system in the same manner as described in the first embodiment. The rotatable diaphragm adjusting ring 91 is connected by means of an adjustable coupling 92 with a ring 93 which in turn is adjustably coupled at 94 to another ring 95 rigidly secured to a sleeve 96 having at its inner end a gear 97. This gear 97, by a suitable transmission to be described presently, is adapted to rotate a worm gear 98 on which a contact member 99 sliding over the resistance 90 is mounted. The worm gear 98 is loosely rotatably mounted on its supporting shaft 111.

The adjustable couplings at 92 and 94 are constructed in the same manner as the couplings 14 and 15 in Fig. 2. The ring 93 is provided with actuating pins 100 and a window 101 through which one number of the film speed scale at the time is visible. This film speed scale, as in the first embodiment is inscribed upon the circumference of the diaphragm adjusting ring 91. The ring 93 has diametrically opposite the window 101 the three letters TGK (Fig. 12). The ring 95 is provided with the actuating pins 102 and also with a mark 103 cooperating with the letters TGK on ring 93.

The gear 97 on the sleeve 96 meshes with a gear 104 on a horizontal shaft 105 which carries a bevel gear 106 meshing with another bevel gear 107 in the vertical shaft 108. The lower end of shaft 108 carries a worm 109 meshing with the gear 98 which is rotatably mounted on a horizontal shaft 111. This worm gear 98 has secured thereto the contact member 99 which is in sliding engagement with the resistance 90 mounted on a plate 112 which is loose on shaft 111.

For the purpose of adjusting the picture frequency of the motion picture camera and for the purpose of adjusting independently of this the rotatable shutter sector, there is provided a planetary gearing between these means for adjusting the resistance 90 correspondingly.

The adjustment of the picture frequency is accomplished by rotating the knob 114 fixedly secured on the outer end of the shaft 111 which passes through the side wall of the camera casing 80. Rotation of knob 114 causes a rotation of gear 115 which is fixed on shaft 111 and meshes with gear 116 on shaft 117 which also carries a cam 118 controlling the speed of rotation of the governor 119. The scale 120 indicates the picture frequency for which the camera has been adjusted.

The gear 115 meshes also with a planetary gear 121 which is loosely rotatable on a stub shaft 122 secured to the plate 112 which carries the resistance 90. Planetary gear 121 in turn meshes with another planetary gear 123 likewise mounted loosely rotatable on the plate 112 by means of stub shaft 124. The last named planetary gear 123 meshes also with a sun gear 125 loosely rotatably mounted on shaft 111. This sun gear 125 is adapted to be rotated by a gear 126 fixed to a shaft 127 which extends through the side wall of the camera casing and is provided with an actuating knob 128. The shaft 127 carries also a cam 129 which upon rotation of the knob 128 causes a variation in the adjustment of the shutter sector by adjusting the two rotatable plates 130 and 131 relatively to each other. The scale 132 indicates the adjustment of the sector. It will be noted that upon rotation of either knob 114 or 128 the adjustment of the knob not rotated remains undisturbed, because the planetary gear of the adjustment not operated merely rolls along the circumference of its associated sun gear 115 or 125 respectively.

Fig. 13 illustrates diagrammatically the coupling of the various parts of the motion picture camera with the resistance of the photoelectric exposure meter. After the couplings at 94 and 92 have been adjusted to take care of the prevailing light condition, whether natural light (T) artificial light (K) or filtered light (G) passes through the lens system, and of the employed film sensitiveness or film speed (not to be confused with the speed the film is driven past the lens), the diaphragm may be adjusted. During the adjustment of the diaphragm the contact member 99 is moved along the resistance 90. Then the resistance 90 may be varied by adjusting the picture frequency or the shutter sector or both until the measuring instrument has been brought to the required predetermined position. This adjustment of the resistance 90 is diagrammatically indicated in Fig. 13 by the threaded spindle 135.

What I claim as my invention is:

1. In a camera, the combination of a photoelectric exposure meter, a lens system, a shutter, means for varying the speed of said shutter, a diaphragm, means for varying the aperture of said diaphragm, a variable resistance in the circuit of said photoelectric exposure meter, said resistance comprising two movable members, each being movable relatively to the other, means operatively connecting said diaphragm aperture varying means with one of the said movable members for varying said resistance when the diaphragm aperture is varied, means operatively connecting said shutter speed varying means with the other one of the said two members for varying said resistance when the shutter speed is varied, means for adjusting said resistance selectively for natural light, filtered light and artificial light passing through said lens system respectively, and means for adjusting said resistance for the use of various film speeds, both of said last named adjusting means being arranged in the first mentioned operative connection between said diaphragm aperture varying means and one of the said two members of said resistance.

2. In a camera, the combination of a photoelectric exposure meter, a lens system, a shutter, means for varying the speed of said shutter, a diaphragm, means for varying the aperture of said diaphragm, a variable resistance in the circuit of said photoelectric exposure meter, said resistance comprising two rotatable members, each being rotatable relatively to the other, means operatively connecting said diaphragm aperture varying means with one of the said two members for varying said resistance when the diaphragm aperture is varied, means operatively connecting said shutter speed varying means with the other one of the said two members for varying resistance when the shutter speed is varied, means for adjusting said resistance selectively for natural light, filtered light and artificial light passing through said lens system respectively, and means for adjusting said resistance for the use of various film speeds, both of said last named adjusting means being mounted on said lens system and being arranged in the first named operative connection between said diaphragm aperture varying means and one of the said two members of said resistance.

3. In a camera, the combination of a photoelectric exposure meter, a lens system provided with a variable diaphragm and a manually rotatable diaphragm adjusting ring, a shutter, means for varying the speed of said shutter, a variable resistance in the circuit of said exposure meter, said resistance comprising two rotatable members, each being rotatable relatively to the other, one of said rotatable members being fixedly attached to said shutter speed varying means, so that said resistance is varied whenever the shutter speed is varied, means operatively connecting said diaphragm adjusting ring with the other one of said two rotatable members for varying said resistance whenever the diaphragm is varied, and a manually adjustable coupling including two relatively rotatably adjustable annular members arranged in said last named operative connection and adapted for adjusting said resistance selectively for natural light, filtered light and artificial light passing through said lens system respectively.

4. In a camera, the combination of a photoelectric exposure meter, a camera casing, a lens system provided with a variable diaphragm and a manually rotatable diaphragm adjusting ring, a shutter, means for varying the speed of said shutter, a variable resistance in the circuit of said exposure meter and mounted in said camera casing, said resistance comprising two rotatable members, each being rotatable relatively to the other, one of said rotatable members being fixedly attached to said shutter speed varying means, so that said resistance is varied whenever the shutter speed is varied, means operatively connecting said diaphragm adjusting ring with the other one of said two rotatable members for varying said resistance whenever the diaphragm is varied, and a manually adjustable coupling including two relatively adjustable members mounted concentrically on said lens system and arranged in said last named operative connection and adapted for adjusting said resistance selectively for natural light, filtered light and artificial light passing through said lens system respectively.

5. In a camera, the combination of a photoelectric exposure meter, a lens system provided with a variable diaphragm and a manually rotatable diaphragm adjusting ring, a shutter, means for varying the speed of said shutter, a variable resistance in the circuit of said exposure meter, said resistance comprising two rotatable members, each being rotatable relatively to the other, one of said rotatable members being fixedly attached to said shutter speed varying means, so that said resistance is varied whenever the shutter speed is varied, means operatively connecting said diaphragm adjusting ring with the other one of said two rotatable members for varying said resistance whenever the diaphragm is varied, and two manually adjustable couplings in said last named operative connection, one of said couplings being adapted to set said resistance for a selected film speed and the other coupling being adapted to set said resistance selectively for natural light, filtered light and artificial light passing through said lens system respectively.

6. In a camera, the combination of a photoelectric exposure meter as set forth in claim 4, in which said couplings include an annular member concentric with said lens system and having a fine inner thread engaging a corresponding exterior thread on said diaphragm adjusting ring, said annular member having also at one end a fine exterior thread engaging a corresponding inner thread on another annular member extending into said camera casing and operatively connected with one of said two movable members comprising said resistance, said fine threads being fitted so tightly that normally all of said annular members rotate simultaneously as a unit when said diaphragm ring is rotated, a relative adjustment of said threadedly connected members being obtained only by holding one of said annular members stationary and rotating the other annular member which is threadedly connected therewith.

7. In a camera, the combination of a photoelectric exposure meter, a camera casing, a lens system provided with a variable diaphragm and a rotatable diaphragm adjusting ring, a shutter, a rotatable shutter speed adjusting member mounted on said camera casing, a variable resistance in the circuit of said exposure meter and mounted in said camera casing, means operatively connecting said diaphragm adjusting ring with said resistance to vary the latter when the diaphragm is varied, manually rotatable means mounted on said lens system and arranged in the operative connection between said diaphragm adjusting ring and said resistance for adjusting said resistance selectively for natural light, filtered light and artificial light passing through said lens system respectively, a contact member on said shutter speed adjusting member in sliding engagement with said resistance, and a support for said resistance rotatable about the same axis as said shutter speed adjusting member, said rotatable support being adapted to be rotatably adjusted by said diaphragm adjusting ring and said manually rotatable means.

8. In a motion picture camera, the combination of a photoelectric exposure meter, a lens system provided with a variable diaphragm and a rotatable diaphragm adjusting ring, a shutter having an adjustable exposure aperture, means for varying said exposure aperture, means for varying the picture frequency, a variable resistance in the circuit of said exposure meter, means operatively connecting said diaphragm adjusting ring with said resistance to vary the latter when the diaphragm is varied, means actuated by said shutter aperture adjusting means to adjust said resistance when the shutter aperture is varied, and means actuated by said picture frequency varying means to adjust said resistance when the picture frequency is varied.

9. In a motion picture camera, the combination of a photoelectric exposure meter as set forth in claim 8, including in the operative connection between said diaphragm adjusting ring and said resistance means for adjusting said resistance selectively for natural light, filtered light and artificial light passing through said lens system respectively.

10. In a motion picture camera, the combination of a photoelectric exposure meter as set forth in claim 8, including in the operative connection between said diaphragm adjusting ring and said resistance means adapted to adjust said resistance for the use of various film sensitivenesses.

11. In a motion picture camera, the combination of a photoelectric exposure meter as set forth in claim 8, including in the operative connection between said diaphragm adjusting ring and said resistance two adjustable couplings, one of which is adapted to adjust said resistance for the "type" of light passing through said lens system, as natural light, filtered light and artificial light, while the other coupling is adapted to adjust said resistance for various film sensitivenesses.

12. In a motion picture camera, the combination of a photoelectric exposure meter as set forth in claim 8, including in the operative connection between said diaphragm adjusting ring and said resistance two adjustable couplings, one of which is adapted to adjust said resistance for the "type" of light passing through said lens system, as natural light, filtered light and artificial light, while the other coupling is adapted to adjust said resistance for various film sensitivenesses, both of said couplings being arranged on said lens system.

13. In a camera, the combination of a photoelectric exposure meter, a camera casing, a lens system provided with a variable diaphragm and a manually rotatable diaphragm adjusting ring, a variable resistance and a contact member in slidable engagement with the same in the circuit of said exposure meter and mounted in said camera casing, means including a train of gears operatively connecting said diaphragm adjusting ring with said resistance to move the latter relatively to the latter when the diaphragm is varied, and two independently manually rotatable annular members mounted on said lens system and arranged in the operative connection between said diaphragm adjusting ring and said resistance, one of said annular members being adapted for adjusting said resistance selectively for natural light, filtered light and artificial light passing through said lens system respectively, the other one of said annular members being adapted to adjust said resistance for the use of various film speeds, said diaphragm adjusting ring being provided with a diaphragm scale and a film speed scale, each of said scales having a uniform division.

14. In a camera, the combination of a photoelectric exposure meter as set forth in claim 13, and including a shutter and a rotatable shutter speed adjusting member mounted on said camera casing, said contact member on being attached to said shutter speed adjusting member, and a support for said resistance rotatable about the same axis as said shutter speed adjusting member, said rotatable support being adapted to be rotatably adjusted by said diaphragm adjusting ring and said manually rotatable annular members, said shutter speed adjusting member being provided with a shutter speed scale of uniform division.

HEINZ KÜPPENBENDER.